May 30, 1933.  E. NIELSEN  1,911,202
FRUIT JUICE EXTRACTOR
Filed Sept. 19, 1931  3 Sheets-Sheet 1
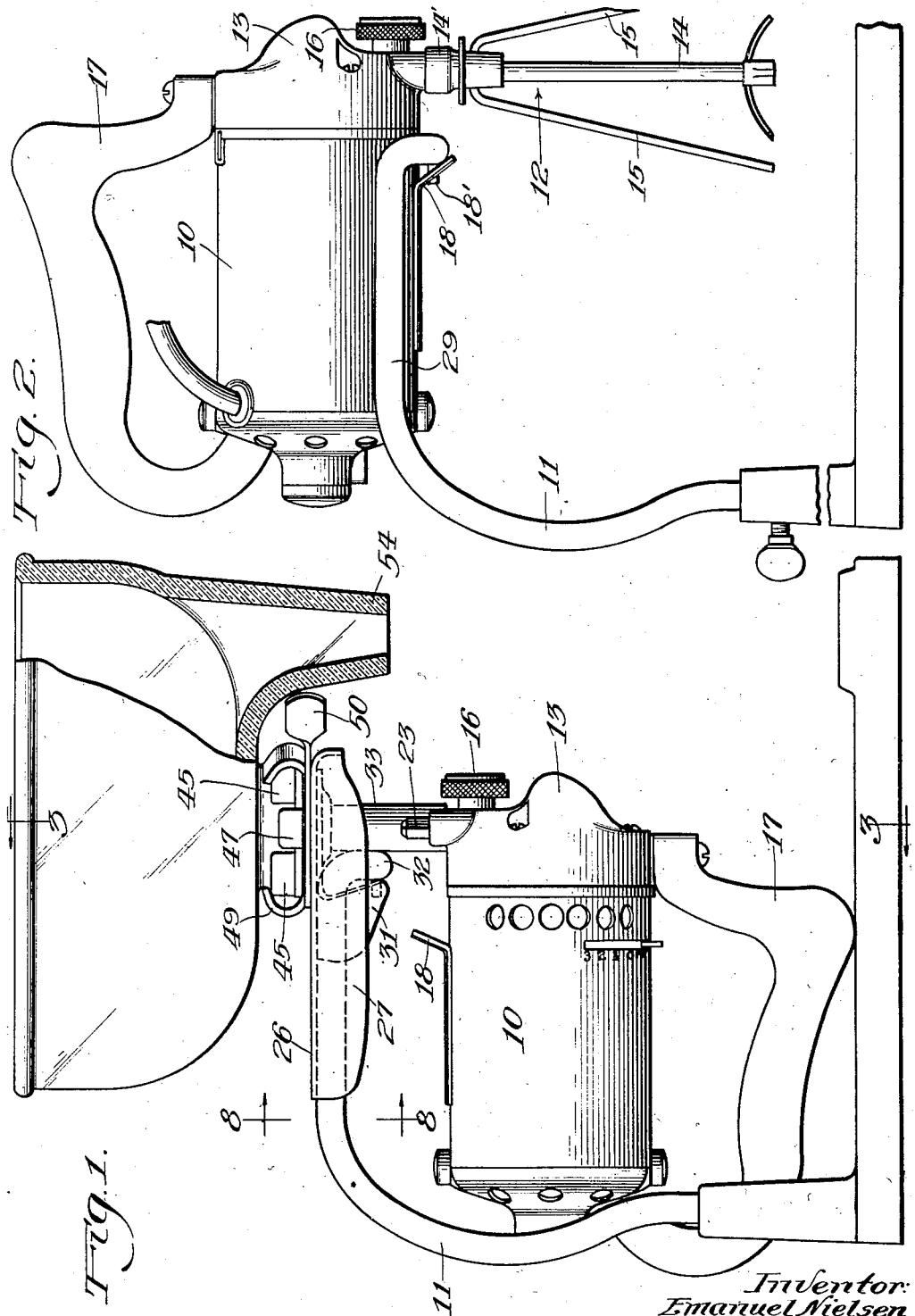

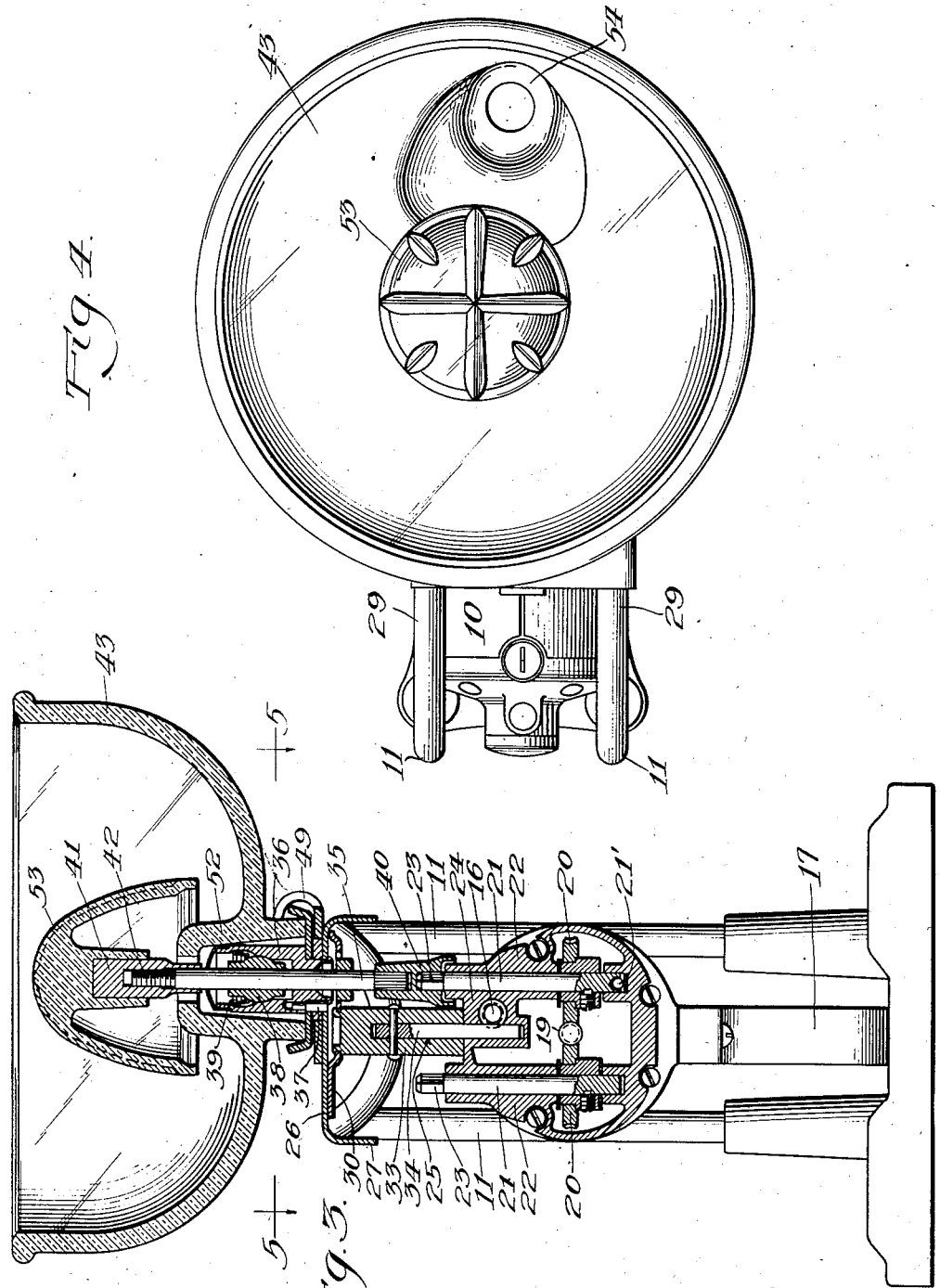

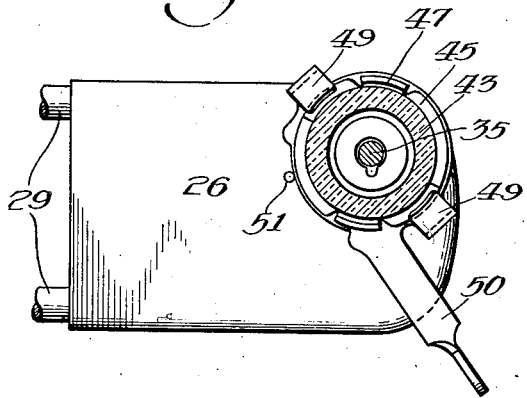
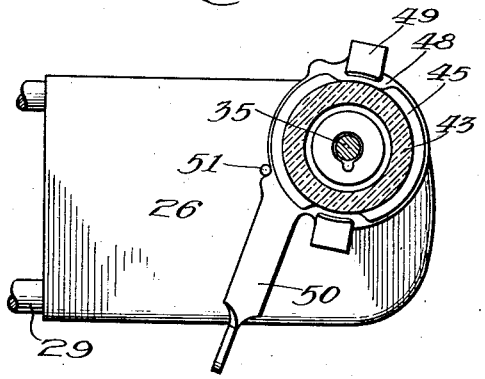
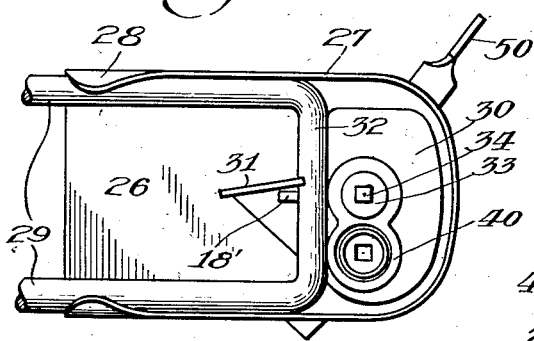
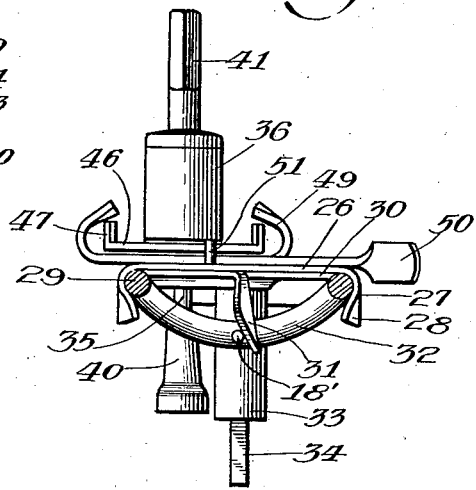
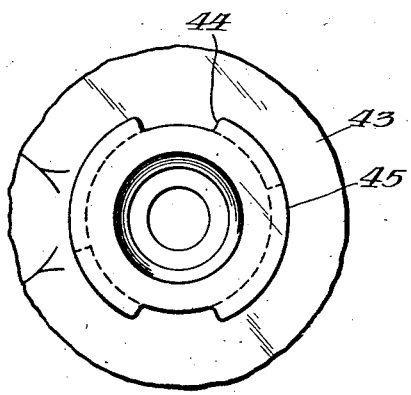
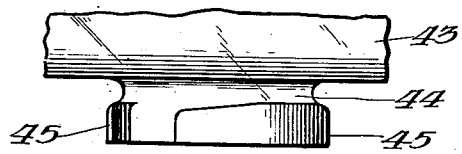

Patented May 30, 1933

1,911,202

UNITED STATES PATENT OFFICE

EMANUEL NIELSEN, OF RACINE, WISCONSIN, ASSIGNOR TO HAMILTON BEACH MANUFACTURING COMPANY, OF RACINE, WISCONSIN, A CORPORATION OF WISCONSIN

FRUIT JUICE EXTRACTOR

Application filed September 19, 1931. Serial No. 563,709.

This invention relates to fruit juice extractors and particularly to an extractor which is adapted to be driven by a motor which is part of a motor driven food mixer.

In the co-pending application of Thomas B. Myers, Serial No. 396,148, filed September 30, 1929, is described in detail a motor driven food mixer of the type which may be used in combination with the extractor herein shown and described.

The main object of the invention is to produce an efficient fruit juice extractor driven by a motor and gearing, and provided with a support, which may be used interchangeably in either the food mixer or the extractor.

Another object is to provide means for quickly and efficiently coupling the juice extractor mechanism to the motor drive shaft.

Another object is to produce a juice extractor adapted for operative connection with an existing type of food mixer motor and gearing without requiring alteration of the said motor and gearing.

Among the advantages of the present invention are simplicity of construction, economy of production and efficiency for its intended purpose.

In the drawings:

Fig. 1 is a side elevation of a motor driven fruit juice extractor embodying my invention.

Fig. 2 is a side elevation of a motor driven food mixer and support which may be interchangeably used in combination with food mixer or beater elements and fruit juice extractor mechanism.

Fig. 3 is a vertical sectional view taken on the line 3—3 of Fig. 1, but showing the bowl attaching means in a different position from that shown in Fig. 1.

Fig. 4 is a plan view of the construction shown in Fig. 1.

Fig. 5 is a horizontal sectional view taken on the line 5—5 of Fig. 3 showing the extractor apron and bowl attaching means in elevation.

Fig. 6 is a view similar to Fig. 5 showing the bowl attaching means in a different position.

Fig. 7 is a bottom view of the extractor apron when positioned on the support.

Fig. 8 is a vertical sectional view taken on the line 8—8 of Fig. 1, with the bowl removed, showing in elevation the extractor apron, the bowl attaching means, the reamer drive shaft and drive shaft bearing housing, and the means for attaching the motor to the apron.

Fig. 9 is a bottom view of part of the bowl.

Fig. 10 is a side elevation of the bottom of the bowl.

In Fig. 2, the motor 10 which is used interchangeably to drive a food mixer and a fruit juice extractor is shown resting on a support 11. An agitator unit 12 is operatively connected with the motor and depends therefrom for mixing foods. In Figs. 1 and 3 the same motor is shown in inverted position, as it appears when functioning to drive the fruit juice extractor.

The motor 10 is provided with a gear casing 13 rigidly secured to the motor casing. 14 indicates one of two food mixer rotatable agitator rods, 15 is the frame work of the agitator unit and 16 indicates a hand actuated screw bolt or plunger which engages part of the frame work of the agitator unit and retains it in the gear casing. The motor handle is indicated at 17. As a food mixer this device is positioned on the support 11 and is adjustably held thereon by means of an apertured flange plate 18 fixed to the motor 10, engaged by the pin 18' on the motor support 11.

When it is desired to use the motor 10 as a means for driving the fruit juice extractor, the agitator unit 12 is removed by unscrewing the bolt 16 and then the motor is turned upside down relatively to the support 11 as shown in Figs. 1 and 3.

The horizontal motor shaft 19 carries a worm gear on its forward end which meshes with worm wheels 20 fixed on the vertically disposed driven shafts 21 mounted in bearings 22. The shafts 21 terminate in square ends 23 which depend from the gear casing 13 and engage the hollow ends 14' of the agitator rods 14 of the unit 12 when the motor is in the position shown in Fig. 2. When the motor is used in connection with the fruit juice extractor mechanism, the square ends 23 protrude upwardly and one of them engages part of the extractor mechanism as will be hereinafter described. Preferably the shaft 21 which drives the extractor shaft is provided with a thrust bearing 21' consisting of a hardened steel disc against which the ball thrust runs with decreased frictional contact, the same being located in the socket of the gear casing 13. The block portion 24 of the gear casing is bored vertically as indicated at 25 in Fig. 3 for receiving the non-rotatable square center support of the food mixer agitator unit (not visible in Fig. 2) or a square rod on the extractor apron.

From this it will be understood that the food mixer motor and gear mechanism are made attachable to the extractor mechanism by simply loosening the part 16 and removing the agitator unit 12.

Referring now more particularly to Figs. 1, 3 and 5 to 8, inclusive, the extractor apron comprises a flat plate 26 provided with a depending marginal flange 27 inturned at 28 to engage the motor rest arms 29 of the support 11. On its under side the apron 26 is reinforced with a plate 30 having a depending tongue 31 which contacts with the cross bar 32 between the arms 29 of the support 11 and prevents the apron from slipping forwardly relatively to said support.

Depending from the plate 30 on the underside of the apron 26 is a member 33 terminating in a square rod 34 which is adapted to enter the bore 25 of the gear casing 13 and to be engaged by the bolt 16 for holding the motor in proper operative position relatively to the extractor apron, as shown in Figs. 1 and 3.

Extending through the apron 26 and plate 30, above and below the same, is a reamer drive shaft 35 mounted in a floating bearing housing 36 located on the apron by a pin 37 and permanently positioned by upsetting the bottom of the bearing housing over the apron 26. Within the bearing housing 36 is a self-aligning bearing 38 and a spring 39 surrounding the bearing 38. The bearing 38 co-operates with the complementally curved inner walls of the housing 36 to provide a floating bearing for the shaft 35. On its lower end the shaft 35 is provided with a cup-shaped member 40 internally shaped to receive the square end 23 of one of the shafts 21 of the motor gearing. The spring 39 normally holds the bearing 38 in its seat but permits movement of the bearing relatively to the housing 36 for the purpose of aligning the shaft 35 with one of the shafts 21 of the motor. Above the housing 36 the shaft 35 is provided with a screw threaded end 42 for carrying the reamer-engaging head 41.

The juice receiving bowl 43 is removably held on the apron 26 by mechanism on the apron engaging flanges on the bowl. The bowl base 44 is formed with two tapered flanges 45, that is, the upper surfaces or shoulders of the flanges are inclined in the same direction. The bowl is preferably made of glass and the parts are so arranged when assembled that the juice does not contact with the metallic parts of the extractor. The bowl attaching means include a locating plate 46 fixed to the bearing housing 36, said plate having oppositely disposed projections 47 adapted to fit between the ends of the flanges 45 on the bowl 43, and a clamping device consisting of a plate 48 having clamp arms 49 and an operating lever 50. The clamping device is located between the locating plate 46 and apron 26. The bowl 43 may be positioned on the plate 46 when the clamping arms 49 are above the locating plate projections 47, as shown in Fig. 6. The space between the bowl flanges 45 accommodates the parts 47 and 49. The lever 50 is actuated from the position shown in Fig. 6 away from the stop pin 51 on the apron 26, to the position shown in Fig. 5 or until the clamping members 49 will have ridden up on the flanges 45 to the fullest extent and securely hold the bowl 43 in position on the apron.

On its inner surface the bowl is preferably provided with an integral inverted cup-shaped member 52, best shown in Fig. 3, which is centrally apertured to fit over the shaft 35—41, and to cover the bearing housing 36 when the bowl is in position. The aperture in the cup-shaped member is sufficiently large to permit the bowl to be positioned on the locating plate 36 by merely removing the reamer 53 from the head 41. The bowl is provided with a spout 54, which when the bowl is properly positioned as intended will deliver the extracted juices to a container without soiling the motor or other parts of the mechanism.

Changes may be made in details of construction without departing from the scope of my invention and I do not intend to be limited to the exact form shown and described except as set forth in the appended claims.

I claim:—

1. A fruit juice extractor comprising a motor, a raised horizontally disposed support above the motor, a vertical shaft rotatably mounted in the support in operative connection with the motor shaft, a centrally apertured bowl mounted on the vertical shaft, a reamer on the upper end of said shaft, and means between the support and the reamer for holding the bowl on the support, said means comprising a disc having a pair of clamping arms, means for actuating the disc on the support, the shaft extending through the disc, and inclined flanges on the bowl base adapted to be engaged by said clamping arms.

2. A fruit juice extractor comprising a motor, a raised horizontally disposed support above the motor, a vertical shaft rotatably mounted in the support in operative connection with the motor shaft, a centrally apertured bowl and a reamer mounted on the vertical shaft, a locating plate fixed relatively to the support, means on the bowl for engaging the locating plate in a predetermined position, and a clamping device mounted on the shaft between the support and the locating plate for engaging the bowl.

3. A fruit juice extractor comprising a movable motor, a raised support, a horizontally disposed apron removably mounted on the support, an extractor drive shaft rotatably mounted in the apron and extending above and below the same, means for attaching the motor to the apron, means on the extractor drive shaft for operatively connecting one end of the extractor shaft to the motor, and a reamer mounted on the other end of the extractor shaft.

4. A fruit juice extractor comprising a motor, a raised support, a horizontally disposed apron removably mounted on the support, means on the apron for engaging the support to prevent forward movement of the apron on the support, an extractor drive shaft rotatably mounted in the apron and extending above and below the same, means for attaching the motor to the apron, means on the extractor drive shaft for operatively connecting one end of the extractor shaft to the motor, and a reamer mounted on the other end of the extractor shaft.

5. A fruit juice extractor comprising a raised support, a motor, a horizontally disposed apron removably mounted on the support, means beneath the apron for attaching the motor to the apron, an extractor drive shaft rotatably mounted in and extending through the apron with the lower end in operative connection with the motor, a bowl, the upper end of the extractor drive shaft extending through an aperture in the bowl, and a reamer removably carried on said upper end of the shaft.

6. A fruit juice extractor comprising a raised support, a motor, a horizontally disposed apron removably mounted on the support, a reinforcing plate fixed on the under side of the apron and carrying means for attaching the motor to the apron, an extractor drive shaft rotatably mounted in and extending through the apron and plate with the lower end in operative connection with the motor, a bowl, the upper end of the extractor drive shaft extending through an aperture in the bowl, and a reamer removably carried on the end of said shaft.

7. A fruit juice extractor comprising a food mixer motor, a raised support, a removable apron on the support, an extractor drive shaft rotatably mounted in the apron, a bowl on the apron and a reamer mounted on the upper end of the shaft, said motor being removably attached to the apron in inverted position, and the rotatable shaft being disengageably and operatively connected to the motor shaft.

8. A fruit juice extractor comprising a raised, horizontally disposed, apertured support, a movable motor, a bearing housing on the support surrounding the aperture, a self-aligning bearing in the housing, a shaft rotatably mounted in the bearing and extending through the apertured support, means on the motor for engaging the lower end of the shaft, means for detachably connecting the motor to the support, and a reamer removably mounted on the free end of the shaft.

In testimony, that I, claim the foregoing as my invention, I hereby affix my signature, this second day of September, 1931.

EMANUEL NIELSEN.